United States Patent
Burchell et al.

(10) Patent No.: US 6,375,716 B1
(45) Date of Patent: Apr. 23, 2002

(54) DEVICE FOR SEPARATING $CO_2$ FROM FOSSIL-FUELED POWER PLANT EMISSIONS

(75) Inventors: Timothy D. Burchell, Oak Ridge; Roddie R. Judkins; Kirk A. Wilson, both of Knoxville, all of TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/736,045

(22) Filed: Dec. 13, 2000

(51) Int. Cl.[7] .............................................. B01D 53/04
(52) U.S. Cl. .......................... 95/114; 95/121; 95/148; 96/126; 96/130
(58) Field of Search ........................... 95/90, 114, 117, 95/121, 128, 139, 140, 148, 903; 96/108, 121, 126, 130, 143, 146; 55/527

(56) References Cited

U.S. PATENT DOCUMENTS

| | | | |
|---|---|---|---|
| 5,308,457 A | * | 5/1994 | Dalla Betta et al. ............ 95/143 |
| 5,505,825 A | * | 4/1996 | Gold et al. ..................... 95/126 |
| 5,628,819 A | * | 5/1997 | Mestemaker et al. .......... 96/130 |
| 5,658,372 A | * | 8/1997 | Gadkaree ....................... 95/116 |
| 5,716,427 A | * | 2/1998 | Andreani et al. .............. 95/117 |
| 5,750,026 A | * | 5/1998 | Gadkaree et al. ............. 95/126 |
| 5,912,424 A | * | 6/1999 | Judkins et al. ................ 95/148 |
| 6,090,477 A | * | 7/2000 | Burchell et al. ........... 428/293.4 |

* cited by examiner

Primary Examiner—David A. Simmons
Assistant Examiner—Frank M. Lawrence
(74) Attorney, Agent, or Firm—Akerman, Senterfitt & Eidson, P.A.

(57) ABSTRACT

A gas separation device includes an inner conduit, and a concentric outer conduit. An electrically conductive filter media, preferably a carbon fiber composite molecular sieve, is provided in the annular space between the inner conduit and the outer conduit. Gas flows through the inner conduit and the annular space between the inner conduit and the outer conduit, so as to contact the filter media. The filter media preferentially adsorbs at least one constituent of the gas stream. The filter media is regenerated by causing an electric current to flow through the filter media. The inner conduit and outer conduit are preferably electrically conductive whereby the regeneration of the filter media can be electrically stimulated. The invention is particularly useful for the removal of $CO_2$ from the exhaust gases of fossil-fueled power plants.

15 Claims, 4 Drawing Sheets

DEVICE FOR SEPARATING CO₂ FROM FOSSIL-FUELED POWER PLANT EMISSIONS

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

FIELD OF THE INVENTION

This invention relates generally to the separation of gases, and more particularly to the separation of $CO_2$ from the exhaust gases of fossil-fueled power plants.

BACKGROUND OF THE INVENTION

Carbon dioxide emissions have been identified as a major contributor to the phenomenon of global warming. The removal of this so-called greenhouse gas from the exhaust stream of fossil-fueled power plants is a major ecological and economic issue. There exists to date no method or device for removing $CO_2$ from the exhaust stream of fossil-fueled power plants which satisfies the needs of efficiency and economy. Gas separation technology is an old and well-developed technology, however, prior gas separation technologies cannot separate $CO_2$ from the emissions of fossil-fueled power plants economically.

Natural gas is the cleanest burning of fossil fuels with respect to emission of acid gases such as sulphur dioxide and carbon dioxide. For example, compared to coal, the burning of natural gas results in the emission of only 60–70% of the $CO_2$ emissions of a coal burning system. For the past several years, the perceived abundance of natural gas, advances in gas turbine technology, and many other factors have resulted in significant increases in the use of natural gas for power generation. However, considerable quantities of sub-quality natural gas exist in the United States, and this must be upgraded prior to use. Carbon dioxide is an impurity that creates operational, economic, and environmental problems. It is a diluent without any fuel value, and is an environmental concern as it is one of the greenhouse gases. It is an acid gas and can cause corrosion problems in the presence of water, creating carbonic acid that is quite corrosive to some alloys.

Several $CO_2$ separation and capture technologies have potential for the purification of natural gas. These include amine scrubbing, molecular sieves, cryogenic removal, and membrane separation. Molecular sieves, such as zeolites and activated carbon, are used in pressure swing adsorption (PSA) or temperature swing adsorption systems which separate gas mixtures by selective adsorption of one or more of the gases at high pressure and/or low temperature thus producing a pure product stream. The captured gas is then desorbed by lowering the pressure, or increasing the temperature, of the adsorbent system (thus the system "swings" from a high to low pressure or a low to high temperature). The desorption step regenerates the adsorbent material for reuse during the subsequent adsorption step.

PSA systems typically comprise several adsorption beds, through which the gas stream is passed, allowing for the near complete separation of the selected gas species. The adsorbent materials used in a PSA unit are selected to have the appropriate mean micropore width (typically in the range of 5–10 Å) to selectively adsorb or sieve the required gas species and additionally must possess large surface areas. Currently available adsorbent materials include zeolites with surface areas in the range of 10–350 m²/g, and activated carbons with surface areas in the range of 500–1000 m²/g.

High service-cycle costs have limited the implementation of many technologies for air quality improvements as in the case of activated carbon systems. The effective life of each sorbent depends on both the amount of pollutant captured and the sorptive capacity of that material. Major technical and operating problems associated with granular sorbents include channeling, settling (packing), and resistance to air flow. Conventional activated carbons and carbon molecular sieves are granular in structure. During operation in a PSA system, granular materials suffer attrition and can settle resulting in the formation of channels which allow the fluid stream to bypass the adsorbent. Lower life cycle and service cycle costs are needed to meet the demands of rapidly growing residential and commercial markets.

A new material for filtering gas streams to separate gaseous components of the stream is known as a carbon fiber composite molecular sieve (CFCMS). CFCMS air filter media is an activated carbon media which is described in U.S. Pat. Nos. 5,827,355 and 6,030,698, the disclosures of which are incorporated herein by reference. This patent describes a CFCMS material with a density in the range of about 0.3–0.4 g/cc. This composite is activated to produce a significant volume of mesopores (2–50 nm) and/or micropores (<2 nm). The rigid structure has macropores in the range of 10–500 microns which allow for excellent fluid flow through the sample, resulting in an acceptable pressure drop. The rigid nature of the composite also eliminates problems due to channeling and settling. The material has a continuous carbon structure and is electrically conductive. The passage of electric current, typically 1–20 amps at 1–5 volts for a small segment of media, causes the carbon fiber composite molecular sieve to heat, thus electrically and thermally desorbing sorbed gases.

Cartridge filters have been used in various applications for banked filtration of process gas streams, such as gas turbine exhaust systems and dust collection systems. The cartridges can have several different designs. In one design, the cartridges are essentially tubular and the gas stream flows into contact with the outer surface of the filter and the clean air flows out through the center of the cartridge. The cartridge is periodically purged with a discharge stream of pressurized gas, or by the PSA method. A cartridge filtration system is shown in U.S. Pat. No. 5,961,696, the disclosure of which is hereby incorporated by reference.

SUMMARY OF THE INVENTION

A device for separating gases, and particularly for removing $CO_2$ from fossil-fueled power plant emissions, includes concentric inner and outer conduits defining an inner passage and an annular outer passage. A filter media fills at least a portion of the annular outer passage. The filter media is electrically conductive and preferentially adsorbs at least one of the constituents of the gas stream. Gas flows sequentially through the inner passage and then the outer passage, or through the outer passage and then the inner passage. In the outer passage, the gas contacts the filter media such that the desired gas, such as $CO_2$, is preferentially adsorbed. The filter media is regenerated by applying a power supply to a circuit connecting the conductive filter media, the inner conduit and the outer conduit. The inner and outer conduits are electrically insulated from one another, and the circuit connects the inner and outer conduits through the conductive filter media. Current flows through the conductive filter media to physically desorb the gas from the filter media. A purge gas or vacuum can be applied to facilitate removal of the gas from the filter media. A preferred filter media is CFCMS.

A method for removing $CO_2$ from fossil-fueled power plant emissions includes the steps of flowing the emissions through an inner conduit and through an outer conduit that is concentric to the inner conduit. The gas contacts a filter media in the annular space between the inner and outer conduits. The filter media, preferably CFCMS, is electrically conductive and preferentially adsorbs a desired constituent of the gas stream such as $CO_2$. The $CO_2$ is adsorbed onto the CFCMS, and the product gas stream is vented or sequestered. The CFCMS is regenerated by causing an electric current to flow through the CFCMS. The inner and outer conduits are preferably electrically insulated and conducting, and an electric current is caused to flow between the inner and outer conduits and through the CFCMS to heat the CFCMS and desorb the $CO_2$ from the CFCMS so as to regenerate the CFCMS. A purge gas and/or vacuum can be applied to facilitate the desorption of the $CO_2$ from the CFCMS. The desorbed gases, such as $CO_2$, are vented or sequestered.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

Figure 1:
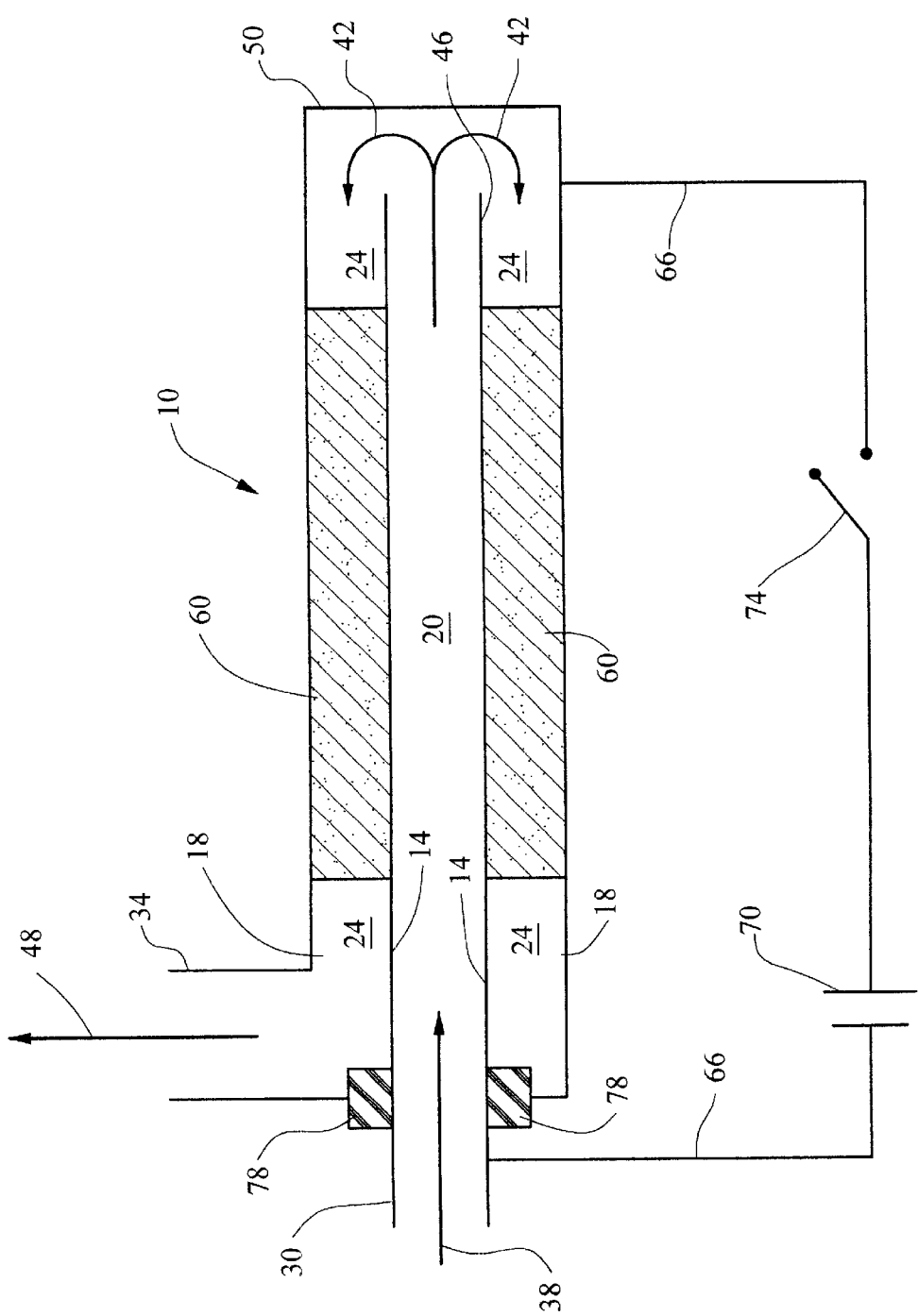
FIG. 1 is a schematic of a filter device according to the invention.

A gas separation device according to an axial flow embodiment of the invention is shown in FIG. 1. The device 10 comprises concentric inner and outer conduits with an inner conduit 14 and an outer conduit 18 creating an inner flow path 20 and an outer, annular flow path 24. An inlet 30 is provided to permit the entrance of gas into the inner flow path 20. An outlet 34 can be provided to permit the exit of gases from the annular flow path 24.

Gas entering the inlet 30 in the direction of the arrow 38 flows axially through the inner path 20 and then is caused to change direction as indicated by the arrows 42 so as to flow through the annular flow path 24. In a preferred embodiment, the inner conduit 14 has an open end 46 substantially opposite to the inlet 30, and the outer conduit 18 has a closed end 50 substantially opposite to the outlet 34. Gas flowing out of the end 46 will strike the closed end 50 and be caused to flow in the direction of arrows 42, and through the filter media 60 and out the outlet 34 in the direction of arrow 48.

It will be appreciated that gas flows through the cartridge 10 can be different from that described above. The gas flow through the cartridge 10 can be reversed from that described, such that the gas stream enters through the opening 34, flows first through the annular space 24, so as to contact the filter media 60, and then the product stream flows out of the cartridge 10 through the inner flow path 20. It is also known that at least one of the inner conduit 14 and outer conduit 18 can be porous or have flow openings therein, so as to permit gas to flow transversely and/or radially into and/or out of the filter media 60.

A filter media 60 is provided in the annular space 24. The filter media 60 must be capable of selectively adsorbing the desired gas constituent or constituents which are to be removed from the gas stream. The filter media must be electrically conductive. The filter media 60 should have sufficient macroporosity to permit the flow of the gas stream through the filter media without excessive pressure drop. The filter media 60 must have a sufficient microporosity to effectively adsorb the desired gas, preferably $CO_2$. Electrically conductive carbonaceous materials with macroporosity and microporosity are preferred.

In a most preferred embodiment, the filter media 60 is CFCMS. The material has a very high-surface area, a narrow micropore distribution centered around mean pore width of 5–10 Å, a high micropore volume, low mesopore volume, a high gas adsorption/desorption rate, and a permeable macrostructure through which fluid can easily pass.

The CFCMS can be manufactured using known processes. One such process is shown in U.S. Pat. No. 5,827,355. As disclosed therein, the material is produced by providing carbon fibers, such as those derived from isotropic pitch precursor or other suitable methods, to define fibers having a diameter of approximately 10–25 µm. The fibers preferably have a length of approximately 400 µm, and can range from 100 to 1,000 µm. The chopped fibers are mixed in a water slurry with a carbonizable organic powder, such as pitch, thermosetting resin or phenolic resin. The slurry is transferred to a molding tank and the water is withdrawn through a porous mold under vacuum. The resulting green form is dried, preferably in air at 50° C. The form is removed from the mold and then cured under suitable conditions, such as in air at approximately 130° C. The composite is then carbonized under suitable conditions, such as for 3 hours under nitrogen at 650° C. to pyrolize the resin binder. This composite material is then activated by suitable methods such as treatment with steam, carbon dioxide, oxygen, or chemical activation. These processes remove carbon and develop pores in the carbon fibers to produce micropores (<2 nm), mesopores (2–50 nm) and macropores (>50 nm).

Regeneration of the filter media 60 is accomplished by electrically stimulating the filter media 60 by causing an electric current to flow through the filter media 60. The inner conduit 14 and outer conduit 18 are preferably electrically conductive. It is alternatively possible to provide electrical contacts in an inner conduit 14 and outer conduit 18 that are otherwise substantially nonconductive. A circuit 66 is connected between the inner conduit 14 and the outer conduit 18. A power supply 70 provides current, either alternating or direct, to the circuit. A switch 74 can be provided to selectively close the circuit 66 so as to cause current to flow between the inner conduit 14, filter media 60, and outer conduit 18. The inner conduit 14 and outer conduit 18 are otherwise electrically insulated by suitable structure such as an insulating ring 78, such that the current must flow through the filter media 60.

The flow of electric current through the filter media 60 acts to physically desorb gas from the filter media 60. The amount of current necessary to accomplish the desorption will depend on the conductivity of the filter media 60, the sorbent loading of the filter media 60, as well as other factors which are known in the art. The power is typically low-voltage, usually less than about 150 volts AC or DC.

The regeneration of the filter media 60 can be assisted by known techniques. A purge gas, which can be the product gas, can be back-flowed through the filter media to assist in the desorption of the sorbate from the filter media 60. A vacuum can be applied to the filter media that is sufficient to assist in the desorption of the adsorbate. Adsorbate removed from the filter media can be transferred by suitable outlet connections to further processing, sequestration or storage facilities. In some cases, the adsorbate may be vented. The adsorbate can be selectively removed from the regeneration gas, to permit the recycling of the regeneration gas.

The feed gas, such as the cooled exhaust stream from a fossil-fueled power plant (e.g., the gas turbine of a natural gas powered electrical generating plant), is fed to the inner conduit 14 and flows in a counter-direction through the CFCMS and the annular space between the inner conduit 14 and outer conduit 18. A feed gas cooling device such as a heat exchanger may be incorporated within or around the feed gas pipe to lower the temperature of the incoming gas to assist in the selective adsorption of the desired constituent.

$CO_2$ gas is preferentially adsorbed onto a CFCMS media from the feed gas mixture, producing a substantially $CO_2$ free gas stream which may be vented to the atmosphere or stored for sale. When the CFCMS becomes saturated with $CO_2$, the inlet gas is switched to another tube element or a bank of tube elements. The CFCMS is regenerated electrically by means of the electric circuit 66, and the desorbed $CO_2$ is fed to a storage vessel for eventual sequestration. A purge gas can be used to make the process more efficient, and a vacuum system can additionally or alternatively be used to enhance regeneration. Alternatively, a downstream fan or pump can be used to draw the $CO_2$ down into a reservoir or storage tank.

Additional piping and valving will be required to allow the input feed gas to be switched from cartridge to cartridge or cartridge bank to cartridge bank. The product stream can be led to a plurality of valves so that it can be switched between an atmospheric vent and a storage vessel or sequestration reservoir. A time-stage desorption cycle will allow specific pollutants to be captured depending on the cycle time for electrically regenerating each pollutant from the CFCMS media.

The invention has a variety of uses in the gas separation field. The device can be used to separate and remove $CO_2$ from exhaust streams of gas turbines and coal-fired plants. It can be used to separate hydrogen from gas mixtures containing $H_2$, CO, $CO_2$, and $H_2O$ resulting from natural gas reforming and coal gasification. It can also be used to separate and capture $CO_2$ to upgrade the quality of subquality natural gas sources. It further can be used for the selective adsorption of $CO_2$ from a $N_2/CO_2$ mixture and odorants from natural gas or $H_2S$ from natural gas. The removal of different gases from different gas streams is possible with the appropriate selection of filter media and process conditions.

Figure 2:
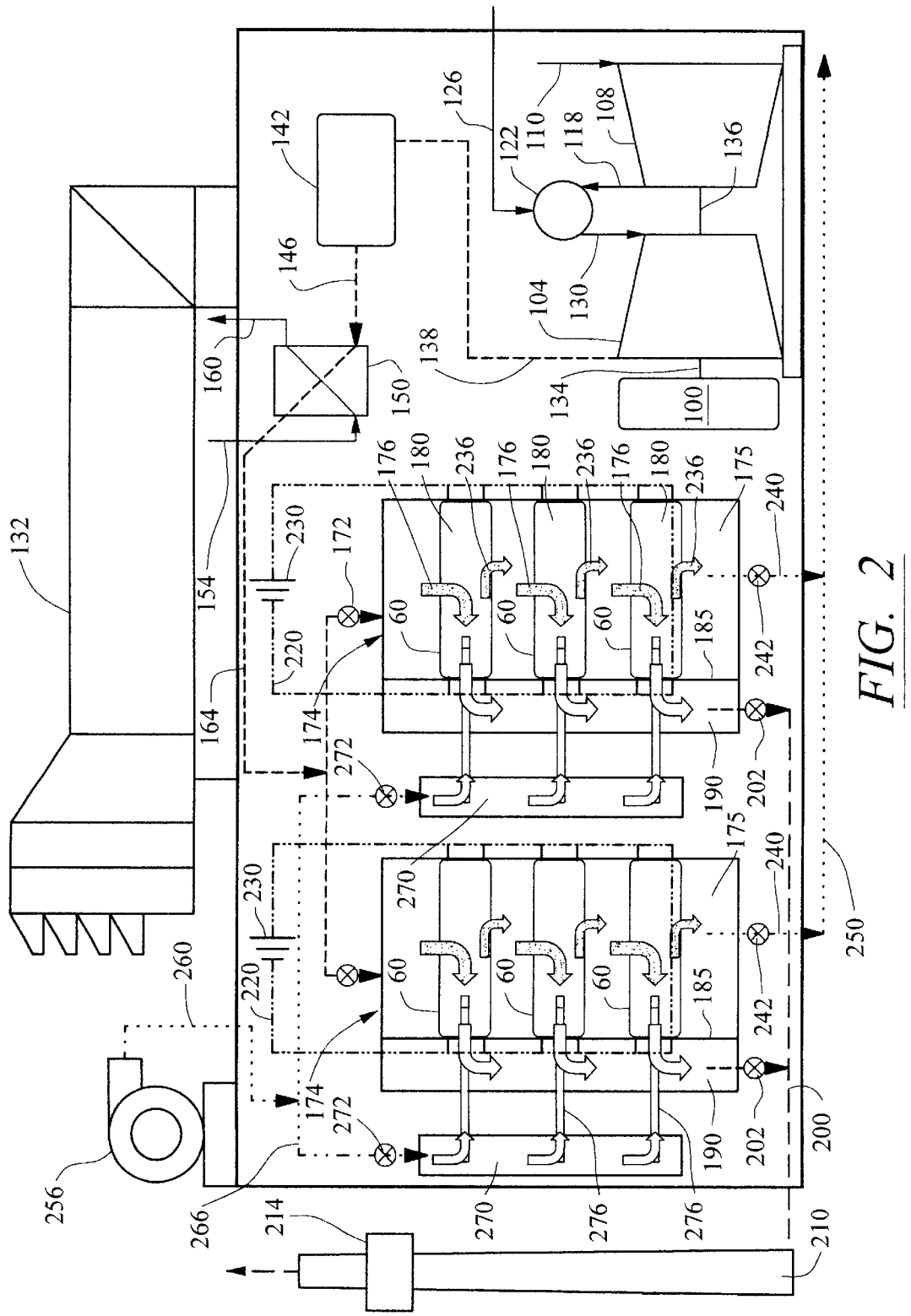
FIG. 2 is a schematic diagram of a system according to the invention for removing $CO_2$ from gas turbine exhaust.

An example of the use of a radial flow embodiment of the invention to remove $CO_2$ from the exhaust gas streams of a fossil-fueled power plant is shown in FIG. 2. The power plant has a generator 100 which is connected to a turbine 104. A compressor 108 compresses air received from an inlet 110 as is known in the art. Air from the compressor 108 passes through a line 118 into a combustion chamber 122. A fuel source such as the natural gas supply line 126 supplies fuel to the combustion chamber 122 which burns the fuel with air and transmits the hot exhaust mixture to the turbine 104 through a suitable line 130. As is known in the art, the turbine 104 is connected by a suitable connection 134 to the generator 100 and by a connection 136 to the compressor 108, whereby the turbine 104 drives the generator 100 and the compressor 108. A filtered outside air intake 132 can be used to supply outside air to the generator as is known in the art. The outside air intake 132 can include suitable intake cartridge particulate filter equipment and the like.

The exhaust from the turbine 104 exits through a turbine exhaust line 138. A silencer 142 can be provided as is known in the art. The exhaust exits the silencer 142 through a suitable line 146 and can enter a heat exchanger 150 which is used to cool the exhaust. The heat exchanger 150 contacts the exhaust with a cooling fluid that is received through an inlet 154 and exits through an outlet 160. The cooling fluid can be obtained from any suitable source and can be a water source or another process stream. The exhaust gas then exits the heat exchanger 150 through a line 164 and enters the separation stage.

The exhaust gas can be distributed to banks of separation devices through an exhaust gas inlet manifold 170. Control valves 172 can be used to regulate the flow of gas into the manifold 170. Each collector housing 174 can comprise a bank of filtration cartridge devices 180 according to the invention. The gas enters the cartridges 180 and contacts the filter media 60, flowing substantially in the direction of arrows 176. The $CO_2$ is preferentially adsorbed onto the filter media 60, which preferably is CFCMS. Purified exhaust gas can be collected in a suitable exhaust gas outlet manifold 190, and can pass through a line 200 to a stack 210 where the exhaust gas can be vented. The flow through the line 200 can be controlled through suitable control structure such as control valves 202. An exhaust gas monitor 214 can be provided to monitor the purity of the exhaust gas.

Figure 4:
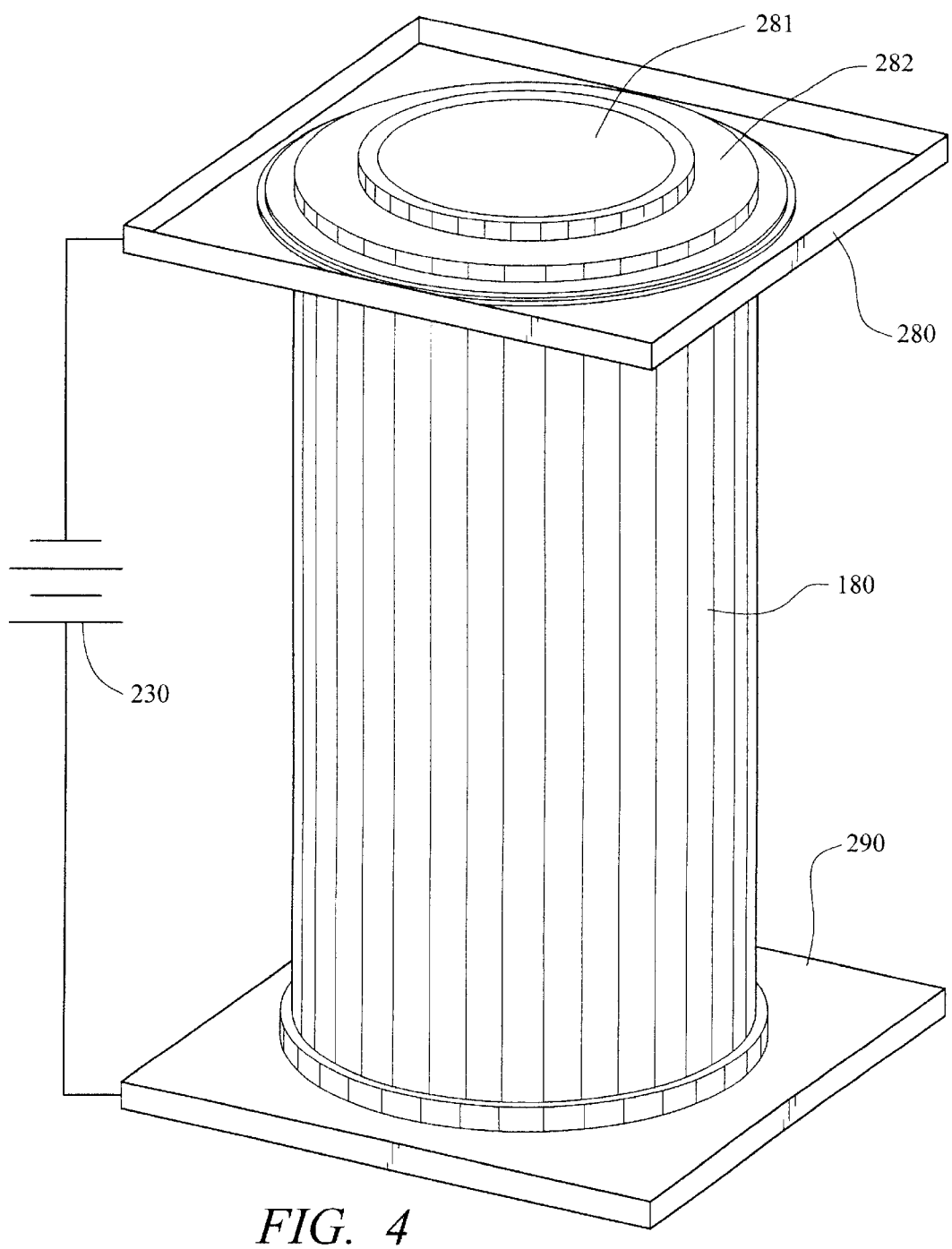
FIG. 4 is a top perspective view of a filter cartridge.

The regeneration of the filter media 60 is accomplished by the provision of a suitable regenerating circuit 220. The regenerating circuit can be connected between the outlet flange 280 and closure flange 290 of each cartridge 180 (FIG. 4). The outlet flange 280 and closure flange 290 can be formed integral to the filter media, or alternatively can be adhered to the filter media by known attachment methods such as carbon glueing. A power supply 230 supplies power at desired intervals to the circuit 220, and causes an electric current to flow through the filter media 60. The passage of electrical current through the filter media 60 causes $CO_2$ to be desorbed from the filter media. The desorbed $CO_2$ exits each cartridge 180 into the collector chamber 175 as shown by arrows 236 and leaves the housing 174 through a line 240. Flow through the lines 240 can be controlled through control valves 242. The $CO_2$ then passes to an outlet 250, which transfers the $CO_2$ to sequestration or further processing.

Regeneration of the filter media 60 can be assisted by known techniques, including the use of a purge gas. A purge gas supply such as the blower 256 supplies purge gas such as air or process gas to each cartridge 180. The regeneration gas enters through a line 260 and then can pass through a distribution line 266 to a regeneration gas manifold 270. The flow of regeneration gas can be regulated by suitable structure such as control valves 272. The regeneration gas then enters through regeneration gas inlets 276 to each cartridge 180. The regeneration gas exits each cartridge 180 through the outlets 236.

Figure 3:
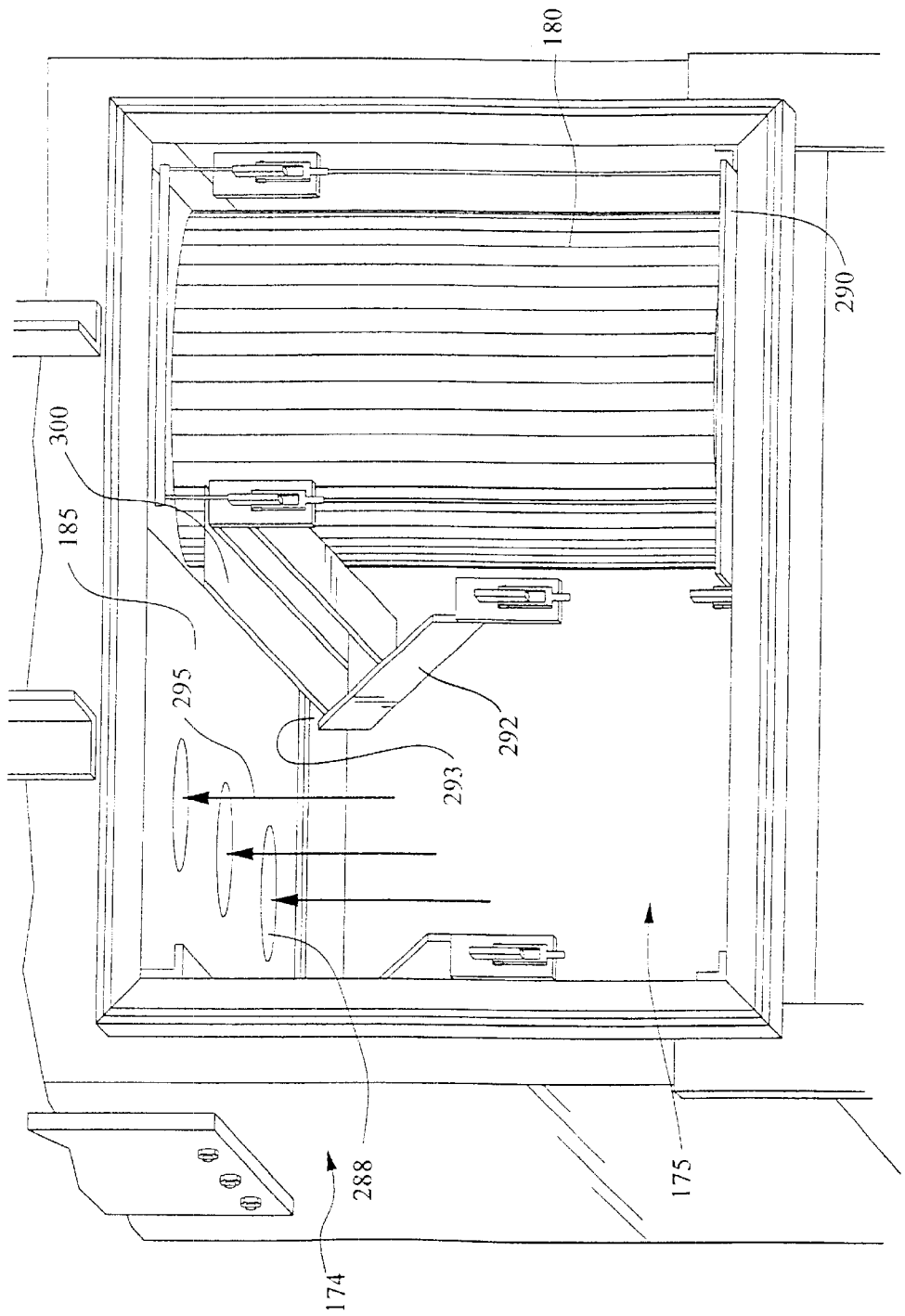
FIG. 3 is a front perspective view of a collector chamber having three filter cartridges installed therein.

A collector according to the invention is show in FIG. 3. The collector has a collector housing 174 defining a collector chamber 175 into which one or more filter cartridges 180 are installed. A ceiling 185 has a plurality of apertures 288. As shown in FIG. 4, the filter cartridge 180 has a closure flange 290 and an outlet flange 280. An exhaust port 281 is provided in the outlet flange 280. A gasket 282 is provided around the exhaust port 281. Power supply 230 is connected between the outlet flange 280 and the closure flange 290. The filter cartridge 180 is installed in the collector chamber 175 such that the exhaust ports 281 are aligned with apertures 288 in the ceiling 185. Suitable structure can be provided to secure the cartridges 180 in the collector such as the locking bar 292 and L-shaped guide rails 300. The locking bar 292 is pivotable about suitable structure such as pivot clip 293 between first and second positions to permit the locking and unlocking of the filter cartridges 180 in position. Gas flows into the collector chamber 175, through the cartridge 180, and is exhausted through the exhaust port 281 and apertures 293. The gasket 282 seals the space between the outlet flange 280 and the ceiling wall 185 to prevent the escape of gas.

This invention can be embodied in other specific forms without departing from the spirit or essential attributes thereof, and accordingly, reference should be had to the following claims, rather than to the foregoing specification, as indicating the scope of the invention, wherein:

We claim:

1. A gas separation device, comprising:
    an electrically conductive inner conduit defining an inner flow path;
    an electrically conductive outer conduit concentric with said inner conduit and defining an annular flow path;
    an electrically conductive filter media, said electrically conductive filter media being at least in part disposed in the annular flow path between the inner conduit and the outer conduit;
    a regeneration circuit electrically connecting said inner conduit, outer conduit, and electrically conductive filter media, whereby a regenerating current can be passed through said filter media to regenerate said filter media and desorb adsorbate gas species.

2. The gas separation device of claim 1, wherein said electrically conductive filter media is a carbon fiber composite molecular sieve.

3. The gas separation device of claim 1, wherein said filter media is provided in a filter cartridge having a solid end plate, said end plate substantially reversing the flow of gas between said inner flow path and said annular flow path.

4. The gas separation device of claim 3, wherein said filter cartridge further comprises an open center end plate opposite said solid end plate, said inner flow path communicating with said opening in said open center end plate.

5. The gas separation device of claim 4, wherein at least three of said filter cartridges are provided in a collector having a collector chamber, a ceiling wall and apertures in said ceiling wall, said open center of said filter cartridges being substantially aligned with said apertures in said ceiling wall.

6. The gas separation device of claim 1, wherein said gas separation device is connected with an exhaust conduit from fossil fueled power plants.

7. The gas separation device of claim 1, further comprising a housing surrounding at least one such gas separation device, a collector chamber defined by said housing communicating with a gas inlet manifold and an exhaust gas outlet manifold;
    said at least one gas separation device comprising a cartridge having said electrically conductive filter media, a first end with an outlet flange disposed thereon and an exhaust port defined by said first end and having a second end with a closure flange forming a closed end cap
    a regeneration circuit electrically connecting said outlet flange, closure flange, and electrically conductive filter media, whereby a regenerating current can be passed through said filter media to regenerate said filter media and desorb adsorbate gas species.

8. A method for filtering a fluid, comprising the steps of:
    causing said fluid to flow through a gas separation device comprising an electrically conductive inner conduit defining an inner flow path; an electrically conductive outer conduit concentric with said inner conduit and defining an annular flow path, and an electrically conductive filter media provided at least in part in the annular flow path between the inner conduit and the outer conduit;
    regenerating said filter media by electrically connecting said inner conduit, outer conduit, and electrically conductive filter media, whereby regenerating current is passed through said filter media to regenerate said filter media.

9. The method of claim 8, wherein said electrically conductive filter media is a carbon fiber composite molecular sieve.

10. The method of claim 8, wherein said fluid is a gas.

11. The method of claim 10, wherein said gas is at least one selected from the group consisting of $H_2$, CO, $CO_2$, $H_2O$, $N_2$, and mixtures thereof.

12. The method of claim 8, wherein said fluid enters in said annular flow path and exist from said inner flow path.

13. The method of claim 8, wherein said fluid is the exhaust gas of a fossil-fueled power plant.

14. The method of claim 8, further comprising the step of applying a purge gas to said filter media during said regeneration step.

15. The method of claim 8, further comprising the step of applying a vacuum to said filter media during said regeneration step.

* * * * *